UNITED STATES PATENT OFFICE.

BRUNO KNIFFLER, OF MILWAUKEE, WISCONSIN, ASSIGNOR TO VERA CHEMICAL COMPANY, OF MILWAUKEE, WISCONSIN, A CORPORATION OF WISCONSIN.

PROCESS OF REMOVING IMPURITIES FROM WATER.

No 828,938.         Specification of Letters Patent.         Patented Aug. 21, 1906.

Application filed March 25, 1904. Serial No. 199,962.

*To all whom it may concern:*

Be it known that I, BRUNO KNIFFLER, residing in Milwaukee, in the county of Milwaukee and State of Wisconsin, have invented a new and useful Process for Removing Impurities from Water and the Like, of which the following is a description.

This invention relates to certain new and useful improvements in the art of clarifying water and other liquids; and it consists in the process for removing impurities from water and the like in which the addition of chemicals to the impure liquid is relied upon to produce a coagulation to which the impurities in the liquid will adhere and then by a separation of the liquid from such coagulation the liquid is freed of its impurities.

With the above object in view the invention consists in adding to impure water or any other liquid containing impurities a chemical, preferably an emulsion, which will readily mix with the liquid without combining therewith, such chemical being of such a nature as to form a coagulation when some other chemical is added thereto, and then adding to the mixture of the impure liquid and the emulsion the latter chemical to produce coagulation of the emulsion, whereby solid impurities of the liquid are collected by the coagulation, so that when the coagulation is separated from the liquid by filtration or decantation the impurities will remain with the coagulation and the liquid freed therefrom.

In practice I employ for removing the impurities from water an emulsion consisting of saponified rosin or saponified rosin with free rosin which is thoroughly mixed with the water, and then by the addition thereto of an acid-acting chemical, such as alum, the emulsion coagulates, the impurities of the water adhering to the coagulation and the coagulation naturally separating from the water, so that the clarified water may be readily drawn off and the coagulation removed with the impurities.

It is obvious that this process for separating impurities from water may be employed with other liquids and that the principle involved is not confined to the use of any particular emulsion, but that it may be carried out by means of any emulsion which may be coagulated by the addition of another chemical after the emulsion has been thoroughly mixed with the liquid.

The term "emulsion" as here used is intended to mean "a liquid mixture in which a fatty or resinous substance is suspended in minute globules," and the "coagulation" of such is intended to mean its physical conversion into a jelly state. This does not include such soluble substances as lime, which may when present in excess remain suspended to form "milk of lime" and the like and which can be precipitated, but not jellified.

What I claim as my invention is—

1. The process of removing impurities from a liquid consisting in thoroughly mixing therewith an emulsion of rosin and an acid-acting chemical, whereby the emulsion will be coagulated and the coagulation will gather the impurities from the water.

2. The process of removing impurities from a liquid comprising the thoroughly mixing therewith of an emulsion of rosin and the adding of alum thereto whereby the emulsion is coagulated and the coagulation gathers the impurities from the liquid.

3. A process for clarifying water by removing the particles of solids held in suspension thereby, comprising the thoroughly mixing with the water of an emulsion of saponified rosin, and later thoroughly mixing therewith an acid-acting chemical whereby the emulsion is coagulated and the coagulation produced gathers the impurities from the water, said coagulation naturally separating from the water with the particles of impurities adhering thereto.

4. The process for clarifying water and other liquids by removing the particles of solids held in suspension thereby, comprising a thoroughly mixing with the water of an emulsion of saponified rosin, and later thoroughly mixing alum therewith whereby the emulsion is coagulated and the coagulation produced gathers the impurities from the water.

In testimony whereof I affix my signature in presence of two witnesses.

BRUNO KNIFFLER.

Witnesses:
R. S. C. CALDWELL,
ANNA F. SCHMIDTBAUER.